(12) United States Patent
Horikawa et al.

(10) Patent No.: US 10,873,089 B2
(45) Date of Patent: Dec. 22, 2020

(54) POSITIVE ELECTRODE MATERIAL AND LITHIUM SECONDARY BATTERY USING THE SAME

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Ryuta Sugiura, Toyohashi (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 123 days.

(21) Appl. No.: 16/214,347

(22) Filed: Dec. 10, 2018

(65) Prior Publication Data

US 2019/0181454 A1  Jun. 13, 2019

(30) Foreign Application Priority Data

Dec. 12, 2017  (JP) .................................. 2017-237310

(51) Int. Cl.
| | | |
|---|---|---|
| *H01M 4/505* | (2010.01) | |
| *H01M 4/525* | (2010.01) | |
| *H01M 4/62* | (2006.01) | |
| *H01M 10/0525* | (2010.01) | |
| *H01M 4/36* | (2006.01) | |
| *H01M 10/42* | (2006.01) | |
| *H01M 4/02* | (2006.01) | |
| *H01M 10/052* | (2010.01) | |

(52) U.S. Cl.
CPC ........... *H01M 4/628* (2013.01); *H01M 4/366* (2013.01); *H01M 4/505* (2013.01); *H01M 4/525* (2013.01); *H01M 4/62* (2013.01); *H01M 10/0525* (2013.01); *H01M 10/4235* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 8,367,247 | B2 * | 2/2013 | Kim .................. | C01G 45/1228 429/231.1 |
| 2013/0130103 | A1 * | 5/2013 | Kim .................. | H01M 10/0525 429/211 |

FOREIGN PATENT DOCUMENTS

| | | |
|---|---|---|
| JP | 2011-210694 A | 10/2011 |
| JP | 2016-149270 A | 8/2016 |

* cited by examiner

*Primary Examiner* — Jonathan Crepeau
(74) *Attorney, Agent, or Firm* — Sughrue Mion, PLLC

(57) ABSTRACT

A positive electrode material for a lithium secondary battery of the present disclosure includes a positive electrode active material, a barium titanate-based dielectric, and at least one of Compound I which contains the element Ba and has the largest peak at a position with 2θ=24° to 26° in an X-ray diffraction pattern obtained according to X-ray diffraction measurement using CuKα rays; and Compound II which contains the element Ti and has the largest peak at a position with 2θ=26° to 28° in an X-ray diffraction pattern obtained according to X-ray diffraction measurement using CuKα rays. At least one of Compounds I and II is disposed in contact with the dielectric.

5 Claims, 1 Drawing Sheet

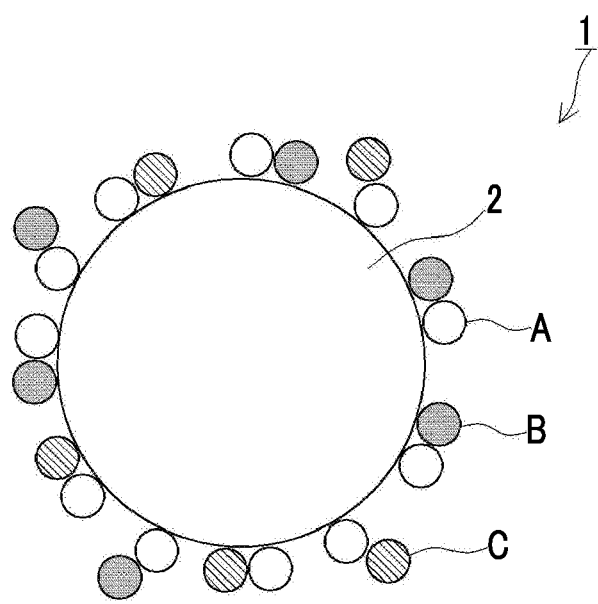

POSITIVE ELECTRODE MATERIAL AND LITHIUM SECONDARY BATTERY USING THE SAME

INCORPORATION BY REFERENCE

The disclosure of Japanese Patent Application No. 2017-237310 filed on Dec. 12, 2017 including the specification, drawings and abstract is incorporated herein by reference in its entirety.

BACKGROUND

1. Technical Field

The present disclosure relates to a positive electrode material and a lithium secondary battery using the same.

2. Description of Related Art

For lithium secondary batteries, higher power density and higher durability have been studied as one form of performance improvement. In connection with this, for example, in Japanese Unexamined Patent Application Publication No. 2011-210694 (JP 2011-210694 A), and Japanese Unexamined Patent Application Publication No. 2016-149270 (JP 2016-149270 A), a positive electrode material in which a ferroelectric material with a high dielectric constant (for example, barium titanate) is adhered to a surface of a positive electrode active material and a lithium secondary battery using this positive electrode material are disclosed.

SUMMARY

However, according to studies by the inventors, it has been newly found that, in a lithium secondary battery using a positive electrode material, a battery temperature increases greatly, for example, when a conductive foreign substance such as a nail is stuck in and internal short-circuiting is caused. In a large capacity lithium secondary battery used as a vehicle drive power supply and the like, it is necessary to realize excellent output characteristics and also reduce an increase in the battery temperature during internal short-circuiting, that is, to increase the internal short-circuit resistance.

The present disclosure provides a positive electrode material that can be used to prepare a lithium secondary battery having excellent output characteristics and internal short-circuit resistance. The present disclosure provides a lithium secondary battery having excellent output characteristics and internal short-circuit resistance.

The present disclosure relates to a positive electrode material including a positive electrode active material, a barium titanate-based dielectric, and at least one of the following Compounds I and II.

Compound I: a compound which contains the element Ba and has the largest peak at a position with $2\theta=24°$ to $26°$ in an X-ray diffraction pattern obtained according to X-ray diffraction measurement using CuKα rays; and Compound II: a compound which contains the element Ti and has the largest peak at a position with $2\theta=26°$ to $28°$ in an X-ray diffraction pattern obtained according to X-ray diffraction measurement using CuKα rays, at least one of Compounds I and II is disposed in contact with the dielectric.

In the positive electrode material, in a part with which the dielectric and at least one of Compounds I and II are in contact, a specific hetero-interface is formed, and lattice distortion occurs in the crystal structure. Therefore, the electrical resistance at the hetero-interface has temperature dependence. That is, at the hetero-interface, the electrical resistance is reduced to a low level when the battery is in a general usage temperature range, but the battery resistance rapidly increases if the temperature exceeds the general usage temperature range of the battery. Therefore, when the battery temperature increases in the time at which internal short-circuiting is caused, it is possible to quickly block a current flow and reduce an increase in the battery temperature. In addition, in the positive electrode material, dielectric polarization increases at the hetero-interface, and lithium ions are attracted to the positive electrode active material more favorably. Therefore, when the positive electrode material is used, it is possible to relatively improve output characteristics compared to when a positive electrode material containing only a dielectric described in, for example, JP 2011-210694 A and JP 2016-149270 A, is used. Therefore, when the positive electrode material is used, it is possible to appropriately realize a lithium secondary battery having excellent output characteristics and internal short-circuit resistance.

A content proportion of the dielectric may be 0.1 mol % or more and 10 mol % or less with respect to 100 mol % of the positive electrode active material. Thereby, an effect of adding a dielectric is exhibited at a high level and it is possible to improve output characteristics more favorably. In addition, even after high rate charging and discharging are repeated, it is possible to maintain excellent output characteristics.

A content proportion of at least one of Compounds I and II may be 0.001 mol % or more and 5 mol % or less with respect to 100 mol % of the positive electrode active material. Thereby, an effect of adding Compound I and/or Compound II is exhibited at a high level, and it is possible to improve output characteristics more favorably. In addition, even after high rate charging and discharging are repeated, it is possible to maintain excellent output characteristics.

At least one of Compounds I and II may be fused to the dielectric. Therefore, compared to when the dielectric and Compounds I and II are simply in contact, a contact area between the dielectric and Compounds I and II relatively increases, and it is possible to form a hetero-interface in a wider range. Thereby, it is possible to exhibit the effect of the technology disclosed herein at a higher level.

In addition, according to the present disclosure, a lithium secondary battery in which a positive electrode includes the positive electrode material is provided. Such a lithium secondary battery has excellent output characteristics and has excellent internal short-circuit resistance through which, for example, when a conductive foreign substance such as a nail is stuck into the battery and internal short-circuiting is caused, an increase in the battery temperature can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic sectional view of a positive electrode material according to an embodiment.

DETAILED DESCRIPTION OF EMBODIMENTS

Preferred embodiments of the present disclosure will be described below with reference to the drawings appropriately. Here, components other than those particularly mentioned in this specification (for example, a composition and properties of a positive electrode material) that are necessary for implementation of the present disclosure (for example, other battery components that do not characterize the present disclosure and a general production process for a battery, and the like) can be recognized by those skilled in the art as design matters based on the related art in the field. The present disclosure can be implemented based on content disclosed in this specification and common technical knowledge in the field. In addition, members and portions having the same functions are denoted by the same reference numerals in the following drawings, and redundant descriptions thereof will be omitted or simplified. The sizes (a length, a width, a thickness, and the like) in the drawings do not necessarily reflect actual sizes. In addition, in this specification, when a numeric range is described as X to Y (here, X and Y are arbitrary values), this range indicates X or more and Y or less.

[Positive Electrode Material]

FIG. 1 is a schematic sectional view of a positive electrode material 1 according to an embodiment. Although no particular limitation is intended, and in the following, the technology disclosed herein will be described in detail using the positive electrode material 1 as an example.

The positive electrode material 1 is a material used for a positive electrode of a lithium secondary battery. The positive electrode material 1 is composite particles. The positive electrode material 1 includes a positive electrode active material 2, a dielectric A, a compound B, and a compound C. The positive electrode active material 2 forms the nucleus of the positive electrode material 1. The dielectric A is adhered to the surface of the positive electrode active material 2. The compounds B and C are adhered to the surface of the dielectric A and are in contact with the dielectric A. Some of the compounds B and C are also adhered to the surface of the positive electrode active material 2. In this manner, in the positive electrode material 1, the positive electrode active material 2, the dielectric A, the compound B, and the compound C are physically and/or chemically adhered to each other and integrated. Here, in the following description, the dielectric A, the compound B, and the compound C will be collectively referred to as an "adhering substance" in some cases.

The positive electrode active material 2 is a material that can reversibly occlude and release lithium ions as charge carriers. The type of the positive electrode active material 2 is not particularly limited. Preferred examples of the positive electrode active material 2 include a lithium transition metal composite oxide, that is, a compound containing the element lithium and one or more transition metal elements. The lithium transition metal composite oxide preferably includes one or more of Ni, Co, and Mn as transition metal elements. Typical examples of the lithium transition metal composite oxide include a lithium transition metal composite oxide having a layered structure, a lithium transition metal composite oxide having a spinel structure, and a lithium transition metal-containing phosphate having an olivine type structure.

Specific examples of the lithium transition metal composite oxide include a lithium and cobalt-containing composite oxide, a lithium and manganese-containing composite oxide, a lithium and nickel-containing composite oxide, a lithium, nickel, and manganese-containing composite oxide, a lithium, nickel, cobalt, and manganese-containing composite oxide, and a lithium, nickel, cobalt, and aluminum-containing composite oxide. Among these, the lithium, nickel, cobalt, and manganese-containing composite oxide is preferable because it has excellent output characteristics and high rate cycle characteristics.

As an example of the lithium, nickel, cobalt, and manganese-containing composite oxide, a composite oxide represented by the following Formula (1) may be exemplified.

$$Li_{1+\alpha}Ni_xCo_yMn_{(1-x-y)}M_zO_{2+\beta}A_\gamma \quad (1)$$

Here, a is $-0.1 \leq \alpha \leq 0.7$, β is a value (typically $-0.5 \leq \beta$, for example $-0.5 \leq \beta \leq 0.5$) determined so that charge neutral conditions are satisfied, and γ is $0 \leq \gamma \leq 0.5$. x is $0.1 \leq x \leq 0.9$, y is $0.1 \leq y \leq 0.4$, and z is $0 \leq z \leq 0.1$. The composite oxide may or may not contain M and A. When $0 < z$ is satisfied, M is one or more elements among Zr, Mo, W, Mg, Ca, Na, Fe, Cr, Zn, Si, Sn, and Al. When $0 < \gamma$ is satisfied, A is one or more elements among halogen elements (for example, F, Cl, and Br).

In Formula (1), a may be $-0.1 \leq \alpha \leq 0.2$. x may be $0.1 \leq x \leq 0.4$. Among composite oxides represented by Formula (1), a composite oxide having x, y, and (1−x−y) of the same degree (for example, a difference is 0.1 or less) has a high energy density and excellent thermal stability. Thereby, it is possible to exhibit an effect of the technology disclosed herein at a higher level.

In the present embodiment, the positive electrode active material 2 has a particle form. The average particle size of the positive electrode active material 2 is not particularly limited. However, in consideration of the workability and handling properties when an adhering substance is adhered to its surface, the average particle size may be about 1 μm or more, for example, 5 μm or more. In addition, in order to densely and homogeneously form a positive electrode, the average particle size may be about 30 μm or less, typically 20 μm or less, for example, 10 μm or less. Here, in this specification, the term "average particle size" means a particle size corresponding to a cumulative 50% from the side of a smaller particle size in a particle size distribution (based on the number thereof) of a circle equivalent diameter based on electron microscopic observation.

The dielectric A has a function of assisting occlusion and release of lithium ions on the surface of the positive electrode active material 2 using dielectric polarization. The dielectric A is a barium titanate-based material. That is, the dielectric A is a compound containing the element barium, the element titanium, and the element oxygen. The dielectric A may be barium titanate ($BaTiO_3$) including barium, titanium, and oxygen or may be, for example, a compound in which one or more alkaline earth metal elements such as Ca and Sr and rare earth metal elements such as Y, Nd, Sm, and Dy are added to barium titanate. In addition, it is needless to say that incorporation of inevitable impurities generated in a production process and the like is allowed.

In order to more favorably exhibit the action of dielectric polarization, a dielectric constant of the dielectric A is about 10 or more, and preferably 100 or more, for example, 200 or more, about 10,000 or less, typically 5,000 or less, and as an example, the dielectric constant may be 1,000 or less, for example, 500 or less.

In the present embodiment, the dielectric A has a particle form. The average particle size of the dielectric A is not particularly limited. However, generally, in order to efficiently perform adhesion to the surface of the positive electrode active material 2, the average particle size of the dielectric A is smaller than the average particle size of the positive electrode active material 2, and may be about 1 µm or less (1,000 nm or less), typically 10 nm to 500 nm, for example, 50 nm to 200 nm. Generally, when the average particle size is larger, the dielectric constant of the dielectric A tends to be higher. Therefore, when the average particle size is set to a predetermined value or more, the dielectric constant increases and it is possible to exhibit the function of assisting occlusion and release of lithium ions more favorably. On the other hand, when the average particle size is set to a predetermined value or less, an area in contact with the positive electrode active material 2 is widened and dielectric polarization can be generated more favorably. In this regard, the average particle size of the dielectric A may be about 1/100 to 1/2, typically, 1/50 to 1/3, for example, 1/20 to 1/10, of the average particle size of the positive electrode active material 2. Within the above range, it is possible to improve output characteristics and high rate cycle characteristics more favorably.

A content proportion of the dielectric A is not particularly limited, but may be about 0.01 to 30 mol %, typically 0.05 to 15 mol %, and preferably 0.1 to 10 mol %, for example, 0.1 to 1 mol % with respect to 100 mol % of the positive electrode active material 2. Within the above range, an effect of adding the dielectric A is exhibited at a high level and it is possible to improve output characteristics more favorably. In addition, even after high rate charging and discharging are repeated, it is possible to maintain excellent output characteristics.

The compounds B and C are in contact with the dielectric A. The compounds B and C are materials that form a hetero-interface in a part in contact with the dielectric A and cause lattice distortion in the crystal structure. The hetero-interface has a new function that is not exhibited when the dielectric A, the compound B, and the compound C are independently used. As an example, the hetero-interface causes a characteristic that a battery resistance rapidly increases if the temperature exceeds a general usage temperature range of a battery whereas an electrical resistance is reduced to a low level in the general usage temperature range of the battery. Therefore, when a temperature inside the battery increases, for example, after a conductive foreign substance is stuck in and internal short-circuiting is caused in the battery, or after the voltage exceeds a predetermined voltage and the battery is overcharged, it is possible to quickly block a current flow and reduce an increase in the battery temperature. In addition, as another example, the hetero-interface has a function of increasing dielectric polarization of the dielectric A. Therefore, when the compounds B and C are included together with the dielectric A, lithium ions in the nonaqueous electrolyte are more easily attracted to the positive electrode active material. As a result, it is possible to exhibit relatively high output characteristics compared to when only the dielectric A is included. Here, while some of the compounds B and C are adhered to the positive electrode active material 2 in the present embodiment, for example, the compounds B and C may be adhered to only the dielectric A without being in contact with the positive electrode active material 2.

The compound B is a compound which contains the element barium (Ba) and has the largest peak at a position of a diffraction angle $2\theta=24°$ to $26°$ in an X-ray diffraction pattern obtained according to X-ray diffraction measurement using CuKα rays. The compound B is typically an oxide. The compound B may have a perovskite type crystal structure. Preferred examples of the compound B include a barium transition metal composite oxide which contains the element barium and a transition metal element.

Examples of the barium transition metal composite oxide include a composite oxide represented by a general formula: $(Ba_{1-x}M^I_x)M^{II}O_3$. Here, x is a real number that satisfies $0 \leq x \leq 1$, and when $0 < x$ is satisfied, $M^I$ is one or more among alkaline earth metal elements and rare earth metal elements, and among one or more transition metal elements, $M^{II}$ is preferably a barium transition metal composite oxide represented by a general formula: $BaM^{II}O_3$. Here, $M^{II}$ is one or more transition metal elements. Specific examples (and its diffraction angle 2θ) of the compound B include, for example, $BaMnO_3$ ($2\theta=25°$), $BaCoO_3$ ($2\theta=24°$), $BaNiO_3$ ($2\theta=26°$), and $BaFeO_3$ ($2\theta=24°$).

The compound C is a compound which contains the element titanium (Ti) and has the largest peak at a position of a diffraction angle $2\theta=26°$ to $28°$ in an X-ray diffraction pattern obtained according to X-ray diffraction measurement using CuKα rays. The compound C is typically an oxide. Preferred examples of the compound C include a composite oxide which contains the element titanium and at least one of an alkaline earth metal element and a rare earth metal element. Examples of the compound C include a composite oxide represented by a general formula: $M^{III}_4Ti_{12}O_{27}$. Here, $M^{III}$ is one or more transition metal elements. Specific examples (and its diffraction angle 2θ) of the compound C include, for example, $Ba_4Ti_{12}O_{27}$ ($2\theta=26°$), $Ca_4Ti_{12}O_{27}$ ($2\theta=28°$), and $La_4Ti_{12}O_{27}$ ($2\theta=27°$).

In the present embodiment, the compounds B and C have a particle form. The average particle size of the compounds B and C is not particularly limited, and generally is smaller than the average particle size of the positive electrode active material 2, and may be about 1 µm or less (1,000 nm or less), typically 10 nm to 500 nm, for example, 50 nm to 200 nm. The average particle size of the compounds B and C may be the same as the average particle size of the dielectric A, and specifically, may be about 0.5 times to 2 times, for example, 0.75 times to 1.25 times, the average particle size of the dielectric A. Within the above range, an area in contact with the dielectric A increases and it is possible to form a hetero-interface in a wider range. Therefore, the effect of the technology disclosed herein is exhibited at a higher level and it is possible to improve output characteristics more favorably.

A total content proportion of the compounds B and C is not particularly limited, but it may be about 0.00001 mol % to 10 mol %, typically 0.0001 mol % to 7 mol %, and preferably 0.001 mol % to 5 mol %, for example, 0.01 mol % to 1 mol % with respect to 100 mol % of the positive electrode active material 2. Within the above range, an effect of adding the compounds B and C is exhibited at a high level and it is possible to improve output characteristics more favorably. In addition, even after high rate charging and discharging are repeated, it is possible to maintain excellent output characteristics.

The compounds B and C are preferably fused with the dielectric A. Therefore, an area in contact with the dielectric A can increase compared to when the compounds B and C are simply in surface-contact with the dielectric A. As a result, it is possible to form the hetero-interface in a relatively wide range and it is possible to exhibit the function of increasing dielectric polarization at a high level. Thereby, it is possible to exhibit the effect of the technology disclosed herein more favorably. Here, in this specification, the term "fuse" means that the compounds B and C are physically and/or chemically bonded to the dielectric A and integrated without boundaries between particles. Particles that are fused can be confirmed if an interface boundary between particles of the dielectric A and the compounds B and C is not identified, for example, when the positive electrode material 1 is observed under an electronic microscope (for example, transmission electron microscope; TEM).

The average particle size (secondary particle size) of the positive electrode material 1 is not particularly limited, but it may be about 0.1 μm or more, typically 1 μm or more, for example, 5 μm or more, in consideration of handling properties and the workability when a positive electrode is prepared. In addition, in order to densely and homogeneously form a positive electrode, the average particle size may be about 30 μm or less, typically 20 μm or less, for example, 10 μm or less.

[Method of Producing Positive Electrode Material]

The positive electrode material 1 can be produced according to a production method including, for example, the following processes: (Step 0) process of preparing the positive electrode active material 2; (Step 1) process of adhering the prepared positive electrode active material 2 to the dielectric A; and (Step 2) process of adhering the compounds B and C to the positive electrode active material 2 to which the dielectric A is adhered. The processes will be described below in order.

(Step 0)

In this process, the positive electrode active material 2 is prepared. As the positive electrode active material 2, a commercially available product may be purchased or the positive electrode active material 2 may be prepared by a known method of the related art. As an example, a lithium transition metal composite oxide is prepared as the positive electrode active material 2. For example, the lithium transition metal composite oxide may be appropriately pulverized so that it has the average particle size described above.

(Step 1)

In this process, the dielectric A is adhered to the positive electrode active material 2 prepared in Step 0. Examples of a method of adhering the dielectric A include a solid phase method described in JP 2011-210694 A and a liquid phase method described in JP 2016-149270 A. As an example, the liquid phase method is used, first, a Ba-containing alkoxide and a Ti-containing alkoxide being mixed at a predetermined molar ratio to prepare a coating solution. Next, the coating solution and the positive electrode active material 2 are mixed at a predetermined ratio. Then, for example, the mixture of coating solution and the positive electrode active material 2 is heated to a temperature of about 500° C. to 1,000° C. Therefore, $BaTiO_3$ as the dielectric A is sintered on the surface of the positive electrode active material 2.

(Step 2)

In this process, the compounds B and C are additionally adhered to the positive electrode active material 2 to which the dielectric A prepared in Step 1 is adhered. As a method of adhering the compounds B and C, for example, a barrel sputtering method, vacuum deposition method, a pulsed laser deposition (PLD) method, a chemical vapor deposition (CVD) method, an electrostatic spraying method, or a dry mixing method can be appropriately used. Among these, in order to exhibit the effect of the technology disclosed herein at a high level, a method in which the compounds B and C can be fused to the dielectric A, for example, a barrel sputtering method, a vacuum deposition method, a PLD method, a CVD method, or an electrostatic spraying method is preferably used. For example, when the barrel sputtering method is used, one or more of the above materials as the compounds B and C are used as sputtering targets, and while particles of the positive electrode active material 2 are rotated, sputtering may be performed uniformly on surfaces of the particles. Accordingly, the compounds B and C are electrically attracted to the dielectric A and fused to the surface of the positive electrode active material 2 and/or the dielectric A. In addition, for example, when the dry mixing method is used, the positive electrode active material 2 and the compounds B and C are mixed in particle forms, and may be heated, for example, at a temperature of about 500° C. to 1,000° C. Therefore, the compounds B and C are sintered on the surface of the positive electrode active material 2 and/or the dielectric A. As described above, the positive electrode material 1 can be produced.

Here, the positive electrode material 1 includes both the compounds B and C, but as described above, the compounds B and C have the same actions and effects. Therefore, the positive electrode material 1 may include at least one of the compounds B and C and does not necessarily include both the compounds B and C. In other words, when the positive electrode material 1 includes the compound B, it may not include the compound C. In this case, the positive electrode material 1 may include, for example, the positive electrode active material 2, the dielectric A, and the compound B. In addition, when the positive electrode material 1 includes the compound C, it may not include the compound B. The positive electrode material 1 may include, for example, the positive electrode active material 2, the dielectric A, and the compound C.

In addition, in the positive electrode material 1, the dielectric A and the compounds B and C are adhered and integrated to the surface of the positive electrode active material 2. However, the positive electrode active material 2, the dielectric A, and the compounds B and C are not necessarily integrated, and may be composed of, for example, particles of the positive electrode active material 2 and composite particles in which the dielectric A and the compounds B and C are integrated.

[Positive Electrode for Lithium Secondary Battery]

The positive electrode material 1 is used for a positive electrode of a lithium secondary battery. The positive electrode of the lithium secondary battery typically includes a positive electrode current collector and a positive electrode active material layer formed on the positive electrode current collector. Examples of the positive electrode current collector include a foil of a metal such as aluminum. The positive electrode active material layer includes at least the positive electrode material 1. In addition to the positive electrode material 1, the positive electrode active material layer may include an optional component such as a conductive material, a binder, and a dispersant as necessary. Examples of the conductive material include a carbon material such as carbon black, typically, acetylene black and Ketchen black. Examples of the binder include a halogenated vinyl resin such as polyvinylidene fluoride (PVdF) and a polyalkylene oxide such as polyethylene oxide (PEO).

[Lithium Secondary Battery]

The positive electrode is used to construct a lithium secondary battery. The lithium secondary battery includes the positive electrode, a negative electrode, and a nonaqueous electrolyte. The negative electrode may be the same as that in the related art, and is not particularly limited. The negative electrode includes typically a negative electrode current collector and a negative electrode active material layer formed on the negative electrode current collector.

Examples of the negative electrode current collector include a foil of a metal such as copper. The negative electrode active material layer includes at least a negative electrode active material. The negative electrode active material is a material that can reversibly occlude and release lithium ions as charge carriers. A preferred example of the negative electrode active material includes a carbon material, for example, graphite. The negative electrode active material layer may include an optional component such as a binder and thickener as necessary in addition to the negative electrode active material. Examples of the binder include rubbers such as styrene butadiene rubber (SBR) and a halogenated vinyl resin such as polyvinylidene fluoride (PVdF). Examples of the thickener include celluloses such as carboxymethyl cellulose (CMC).

The nonaqueous electrolyte may be the same as in the related art, and is not particularly limited. The nonaqueous electrolyte includes typically a supporting salt and a nonaqueous solvent. The nonaqueous electrolyte is typically a nonaqueous electrolytic solution in a liquid state at room temperature (25° C.). The supporting salt dissociates in a nonaqueous solvent and generates lithium ions as charge carriers. Examples of the supporting salt include a fluorine-containing lithium salt such as $LiPF_6$, and $LiBF_4$. Examples of the nonaqueous solvent include an aprotic solvent such as carbonates, esters, ethers, nitriles, sulfones, and lactones. The nonaqueous electrolyte may include, for example, a film forming agent such as lithium bis(oxalato)borate (LiBOB) and vinylene carbonate (VC) and a gas generating agent such as biphenyl (BP) and cyclohexylbenzene (CHB) in addition to the supporting salt and nonaqueous solvent described above.

[Applications of Lithium Secondary Battery]

A lithium secondary battery including the positive electrode material 1 in a positive electrode can be used for various applications, and has both better output characteristics and internal short-circuit resistance than those of the related art. Therefore, the lithium secondary battery disclosed here can be preferably used for, for example, an application for which a high power density is required by taking advantage of such features. Specifically, for example, the lithium secondary battery can be preferably used as a power source (drive power supply) for a motor mounted in a vehicle. The type of the vehicle is not particularly limited, but typically includes a vehicle such as, for example, a plug-in hybrid vehicle (PHV), a hybrid vehicle (HV), and an electric vehicle (EV). Here, the lithium secondary battery may be used in the form of an assembled battery in which a plurality of batteries are connected in series and/or parallel.

While several examples related to the present disclosure will be described below, the present disclosure is not intended to be limited to such examples.

Test Example I. Study on Effect of Compounds B and C

Preparation of Positive Electrode Material

Comparative Example 1

As a positive electrode active material, lithium nickel cobalt manganese composite oxide (layered structure, $LiNi_{0.33}Co_{0.33}Mn_{0.33}O_2$) particles having an average particle size of 10 μm were prepared. In Comparative Example 1, these particles were used as the positive electrode material without change.

Comparative Example 2

First, a positive electrode active material was prepared in the same manner as in Comparative Example 1. In addition, a Ba-containing alkoxide and a Ti-containing alkoxide were mixed at a molar ratio of the element Ba:the element Ti=1:1 to prepare a coating solution. Next, the coating solution and the positive electrode active material were mixed so that a molar ratio after the heat treatment was the positive electrode active material:$BaTiO_3$=100:0.05, and the mixture was heated in atmosphere at 700° C. Therefore, first composite particles in which a dielectric ($BaTiO_3$) was adhered to the surface of the positive electrode active material were prepared. In Comparative Example 2, the first composite particles were used as the positive electrode material.

Example 1

First, $BaMnO_3$ (2θ=25°) was prepared as the compound B. Then, the first composite particles and the compound B were dry-mixed so that the molar ratio was the positive electrode active material:the compound B=100:0.0004, and the mixture was heated in atmosphere at 700° C. Therefore, $BaMnO_3$ was additionally adhered to the positive electrode active material (first composite particles) to which the dielectric was adhered and thereby second composite particles were prepared. Next, $Ba_4Ti_{12}O_{27}$ (2θ=26°) was prepared as the compound C. Then, the second composite particles and the compound C were dry-mixed so that the molar ratio was the positive electrode active material:the compound C=100:0.0004, and the mixture was heated in atmosphere at 700° C. Therefore, $Ba_4Ti_{12}O_{27}$ was additionally adhered to the positive electrode active material to which the dielectric and $BaMnO_3$ were adhered and thereby third composite particles were prepared. In Example 1, the third composite particles were used as the positive electrode material.

Example 2

In Example 2, the second composite particles were used as the positive electrode material.

Example 3

First, as the compound C, the same $Ba_4Ti_{12}O_{27}$ as in Example 1 was prepared. Then, the first composite particles and the compound C were dry-mixed sot that the molar ratio was the positive electrode active material:the compound C=100:0.0008, and the mixture was heated in atmosphere at 700° C. Therefore, $Ba_4Ti_{12}O_{27}$ was additionally adhered to the positive electrode active material (first composite particles) to which the dielectric was adhered and thereby fourth composite particles were prepared. In Example 3, the fourth composite particles were used as the positive electrode material.

Comparative Examples 3 to 5

Composite particles were prepared in the same manner as in Examples 1 to 3 except that a positive electrode active material to which no dielectric was adhered was used in place of first composite particles and used as a positive electrode material.

[Construction of Lithium Secondary Battery]

Lithium secondary batteries were constructed using the positive electrode materials (Examples 1 to 3 and Comparative Examples 1 to 5). Specifically, first, the positive electrode material, acetylene black (AB) as a conductive material, and polyvinylidene fluoride (PVdF) as a binder were weighed out so that the mass ratio was positive electrode active material:AB:PVdF=80:8:2. Next, these materials were mixed into N-methyl-2-pyrrolidone (NMP) using a planetary mixer so that a solid content became 56 mass %, and thus a positive electrode slurry was prepared. This positive electrode slurry was applied along a band-like aluminum foil (positive electrode current collector) in the longitudinal direction using a die coater and dried at 120° C. Then, the dried positive electrode slurry was pressed together with the aluminum foil. Thereby, a band-like positive electrode sheet including the positive electrode active material layer on the positive electrode current collector was prepared.

Next, a band-like negative electrode sheet including a negative electrode active material layer containing graphite (negative electrode active material) on a copper foil (negative electrode current collector) was prepared. Next, the prepared positive electrode sheet and negative electrode sheet were set to face each other with a band-like separator sheet therebetween and were wound in a longitudinal direction to prepare a wound electrode body. Then, a positive electrode current collecting member was welded to the positive electrode sheet, and a negative electrode current collecting member was welded to the negative electrode sheet. Next, a nonaqueous electrolytic solution was prepared by dissolving $LiPF_6$ with a concentration of 1.0 M as a supporting salt in a mixed solvent containing ethylene carbonate (EC), dimethyl carbonate (DMC), and ethyl methyl carbonate (EMC) at a volume ratio of EC:DMC:EMC=1:1:1. Then, the prepared wound electrode body and the nonaqueous electrolytic solution were accommodated in a battery case to construct lithium secondary batteries (Examples 1 to 3 and Comparative Examples 1 to 5).

[Activation Treatment and Measurement of Initial Capacity]

Under a temperature environment of 25° C., the prepared lithium secondary battery was charged at a constant current (CC) with a rate of 1/3 C until the voltage reached 4.2 V, and was then charged at a constant voltage (CV) until the current reached 1/50 C. Next, discharging was performed at a constant current (CC) with a rate of 1/3 C until the voltage reached 3 V. A CC discharging capacity in this case was set as an initial capacity. Also, here, "1 C" means a current value at which a battery capacity (Ah) estimated from a theoretical capacity of an active material can be charged in 1 hour.

[Evaluation of Output Characteristics]

The activated lithium secondary battery was adjusted to a state in which the release voltage was 3.70 V under a temperature environment of 25° C. Next, under a temperature environment of −5° C., CC discharging was performed at a rate of 20 C until a voltage between terminals reached 3.3 V, and a discharging capacity in this case was measured. The results are shown in Table 1. Here, Table 1 shows values normalized using a discharging capacity of the lithium secondary battery according to Comparative Example 1 as a reference (a value of the reference=1.00).

[Evaluation of High Rate Cycle Characteristics]

The activated lithium secondary battery was put into a thermostatic chamber at 60° C. and the battery temperature was stabilized. Then, a charging and discharging operation in which, under a temperature environment of 60° C., CC charging was performed at a rate of 10 C until the voltage reached 4.2 V, and then CC discharging was performed at a rate of 10 C until the voltage reached 3.0 V was repeated for a total of 200 cycles. After 200 cycles, the lithium secondary battery was removed from the thermostatic chamber, and a CC discharging capacity after the high rate cycle was measured in the same manner as in the initial capacity. Then, the CC discharging capacity after the high rate cycle was divided by the initial capacity to calculate a cycle capacity retention rate (%). The results are shown in Table 1. Here, Table 1 shows values normalized using a capacity retention rate of the lithium secondary battery according to Comparative Example 1 as a reference (a value of the reference=1.00).

[Evaluation of Internal Short-Circuit Resistance]

Under a temperature environment of 25° C., the activated lithium secondary battery was CC charged at a rate of 1/3C until the voltage reached 4.2 V and then CV charged until the current reached 1/10C and was fully charged. Next, a thermocouple was attached to the outer surface of the lithium secondary battery. Then, under a temperature environment of 25° C., for the fully charged lithium secondary battery, an iron nail with a diameter of 3 mm was penetrated at a speed of 10 mm/sec into the vicinity of the center of the battery. A maximum temperature of the lithium secondary battery in this case was measured. The results are shown in Table 1. Here, in Table 1, "A" indicates a case in which the maximum temperature was lower than 200° C. and "B" indicates a case in which the maximum temperature was 200° C. or higher. Also, in Table 2 to 6 described later, "A" indicates a case in which the maximum temperature was lower than 200° C. and "B" indicates a case in which the maximum temperature was 200° C. or higher.

TABLE 1

| | Positive electrode material | | | 20 C discharging capacity | Capacity retention rate | Internal short-circuit resistance |
|---|---|---|---|---|---|---|
| | Dielectric | Compound B | Compound C | | | |
| Comparative Example 1 | — | — | — | 1.00 | 1.00 | B |
| Comparative Example 2 | $BaTiO_3$ | — | — | 1.20 | 1.10 | B |
| Example 1 | $BaTiO_3$ | $BaMnO_3$ | $Ba_4Ti_{12}O_{27}$ | 2.03 | 1.55 | A |
| Example 2 | $BaTiO_3$ | $BaMnO_3$ | — | 2.01 | 1.52 | A |
| Example 3 | $BaTiO_3$ | — | $Ba_4Ti_{12}O_{27}$ | 2.02 | 1.53 | A |
| Comparative Example 3 | — | $BaMnO_3$ | $Ba_4Ti_{12}O_{27}$ | 1.05 | 1.03 | B |
| Comparative Example 4 | — | $BaMnO_3$ | — | 1.06 | 1.07 | B |
| Comparative Example 5 | — | — | $Ba_4Ti_{12}O_{27}$ | 1.01 | 1.08 | B |

As shown in Table 1, in Comparative Example 1 in which the positive electrode active material was used as the positive electrode material without change, Comparative Example 2 in which only the dielectric was added to the positive electrode active material, and in Comparative Examples 3 to 5 in which only the compound B and/or the compound C was added to the positive electrode active material, a battery temperature during the nail penetration test increased to 200° C. or higher.

On the other hand, in Examples 1 to 3 in which the dielectric, the compound B and/or the compound C were added to the positive electrode active material, an increase in the battery temperature during the nail penetration test was reduced. In other words, the batteries of Examples 1 to 3 had excellent internal short-circuit resistance. Although the reason for this is not clear, the inventors speculated as follows. That is, a specific hetero-interface was formed at the junction interface between the dielectric and the compounds B and C. In such a hetero-interface, lattice distortion occurred due to a difference in the crystal structure and electrons moved spontaneously in order to stabilize it. Accordingly, a hetero-interface junction became a Schottky junction. As a result, the electrical resistance at the hetero-interface had temperature dependence. That is, at the hetero-interface, the electrical resistance was reduced to a low level when the battery was generally used, but the battery resistance rapidly increased when the internal temperature of the battery increased due to overcharging, internal short-circuiting, or the like. Therefore, it is thought that a current flow was quickly blocked and it was possible to reduce an increase in the battery temperature.

In addition, in Examples 1 to 3, a discharging capacity during high rate discharging and a capacity retention rate after the high rate cycle test were significantly higher than those of Comparative Examples 1 to 5. Although the reason for this is not clear, the inventors speculated that dielectric polarization of the dielectric was enhanced at the hetero-interface and a force attracting lithium ions in the nonaqueous electrolytic solution became stronger.

Test Example II. Study on Contacting Property Between Dielectric and Compounds B and C In Test Example II, lithium secondary batteries were constructed in the same manner as in Examples 2 and 3 of Test Example I except that positive electrode materials of the following Examples 4 and 5 were used, and various evaluations were performed. The results are shown in Table 2.

Example 4

First, first composite particles were prepared in the same manner as in Comparative Example 1. Next, BaMnO₃ was used as a sputtering target, and according to the barrel sputtering method, while the first composite particles were rotated, BaMnO₃ was sputtered to the surface of the particles. Here, in this case, a proportion of the compound B was 0.0008 mol % with respect to 100 mol % of the positive electrode active material. Thus, BaMnO₃ was fused to the dielectric of the first composite particles and thereby composite particles were prepared. In Example 4, the composite particles were used as the positive electrode material.

Example 5

$Ba_4Ti_{12}O_{27}$ was sputtered to the surface of first composite particles according to the barrel sputtering method in the same manner as in Example 4 except that $Ba_4Ti_{12}O_{27}$ was used as a sputtering target. Thus, $Ba_4Ti_{12}O_{27}$ was fused to the dielectric of the first composite particles and thereby composite particles were prepared. In Example 5, the composite particles were used as the positive electrode material.

TABLE 2

| | Positive electrode material | | | | 20 C discharging capacity | Capacity retention rate | Internal short-circuit resistance |
|---|---|---|---|---|---|---|---|
| | Dielectric | Compound B | Compound C | Production method | | | |
| Comparative Example 1 | — | — | — | — | 1.00 | 1.00 | B |
| Example 2 | BaTiO₃ | BaMnO₃ | — | Dry-mixed and sintered | 2.01 | 1.52 | A |
| Example 3 | | — | $Ba_4Ti_{12}O_{27}$ | | 2.02 | 1.53 | A |
| Example 4 | | BaMnO₃ | — | Fused by barrel sputtering | 2.47 | 1.99 | A |
| Example 5 | | — | $Ba_4Ti_{12}O_{27}$ | | 2.50 | 2.03 | A |

As shown in Table 2, in Examples 4 and 5 in which the compound B or the compound C was fused to the dielectric using barrel sputtering, a discharging capacity during high rate discharging and a capacity retention rate after the high rate cycle test were relatively higher than those of Examples 2 and 3. Accordingly, it was found that, when the dielectric and the compounds B and C were fused, the effect of the technology disclosed herein was exhibited at a higher level.

Test Example III. Study on Content Proportion of Dielectric

In Test Example III, lithium secondary batteries were constructed in the same manner as in Examples 4 and 5 of Test Example II except that positive electrode materials of the following Examples 6 to 9 were used, and various evaluations were performed. The results are shown in Table 3.

Examples 6 to 9

In Examples 6 to 9, when first composite particles were prepared, a content proportion of the dielectric with respect to 100 mol % of the positive electrode active material was changed as in Table 3. Then, BaMnO₃ and $Ba_4Ti_{12}O_{27}$ were sequentially sputtered on the surface of the obtained first composite particles according to the barrel sputtering method. Here, in this case, a total proportion of the compounds B and C with respect to 100 mol % of the positive electrode active material was 0.0008 mol %. Thus, the compounds B and C were fused to the dielectric of the first composite particles and thereby composite particles were prepared and used as the positive electrode material.

TABLE 3

| | Positive electrode material | | | Dielectric content proportion (mol %) | 20 C discharging capacity | Capacity retention rate | Internal short-circuit resistance |
|---|---|---|---|---|---|---|---|
| | Dielectric | Compound B | Compound C | | | | |
| Comparative Example 1 | — | — | — | — | 1.00 | 1.00 | B |
| Example 6 | $BaTiO_3$ | $BaMnO_3$ | $Ba_4Ti_{12}O_{27}$ | 0.05 | 2.44 | 1.97 | A |
| Example 7 | | | | 0.1 | 3.10 | 2.44 | A |
| Example 8 | | | | 10 | 3.08 | 2.48 | A |
| Example 9 | | | | 12 | 2.50 | 1.96 | A |

As shown in Table 3, in Examples 7 and 8 in which a content proportion of the dielectric was 0.1 mol % to 10 mol %, a discharging capacity during high rate discharging and a capacity retention rate after the high rate cycle test were relatively high. Accordingly, it was found that, when a content proportion of the dielectric was set to 1 mol % to 10 mol % with respect to 100 mol % of the positive electrode active material, the effect of the technology disclosed herein was exhibited at a higher level.

Test Example IV. Study on Content Proportion of Compounds B and C

In Test Example IV, lithium secondary batteries were constructed in the same manner as in Comparative Example 1 of Test Example I except that positive electrode materials of the following Examples 10 to 13 were used, and various evaluations were performed. The results are shown in Table 4.

Examples 10 to 13

In Examples 10 to 13, the compounds B and C were fused to the dielectric of the first composite particles and thereby composite particles were prepared and used as the positive electrode material in the same manner as in Example 7 except that a total content proportion of the compounds B and C was changed as in Table 4.

TABLE 4

| | Positive electrode material | | | Total content proportion of Compounds B and C (mol %) | 20 C discharging capacity | Capacity retention rate | Internal short-circuit resistance |
|---|---|---|---|---|---|---|---|
| | Dielectric | Compound B | Compound C | | | | |
| Comparative Example 1 | — | — | — | — | 1.00 | 1.00 | B |
| Example 10 | $BaTiO_3$ | $BaMnO_3$ | $Ba_4Ti_{12}O_{27}$ | 0.0001 | 3.06 | 2.50 | A |
| Example 11 | | | | 0.001 | 3.53 | 2.95 | A |
| Example 12 | | | | 5 | 3.48 | 3.06 | A |
| Example 13 | | | | 7 | 3.07 | 2.45 | A |

As shown in Table 4, in Examples 11 and 12 in which a total content proportion of the compounds B and C was set to 0.001 mol % to 5 mol %, a discharging capacity during high rate discharging and a capacity retention rate after the high rate cycle test were relatively high. Accordingly, it was found that, when a total content proportion of the compounds B and C was set to 0.001 mol % to 5 mol % with respect to 100 mol % of the positive electrode active material, the effect of the technology disclosed herein was exhibited at a higher level.

Test Example V. Study on Type of Positive Electrode Active Material

In Test Example V, lithium secondary batteries were constructed in the same manner as in Comparative Example 1 of Test Example I and Example 12 of Test Example IV except that positive electrode materials of the following Examples 14 to 18 and Comparative Examples 6 to 10 were used, and various evaluations were performed. The results are shown in Table 5. Here, the results in Table 5 show values normalized using a discharging capacity when various positive electrode active materials were used as the positive electrode material without change as a reference (a value of the reference=1.00).

Examples 14 to 18 and Comparative Examples 6 to 10

In Comparative Examples 6 to 10, positive electrode active materials shown in Table 5 were used as the positive electrode material without change. In Examples 14 to 18, composite particles were prepared in the same manner as in Example 12 except that materials shown in Table 5 were used as the positive electrode active material, and used as the positive electrode material.

TABLE 5

| | Positive electrode material | | | | 20 C discharging capacity | Capacity retention rate | Internal short-circuit resistance |
|---|---|---|---|---|---|---|---|
| | Positive electrode active material | Dielectric | Compound B | Compound C | | | |
| Comparative Example 1 | $LiNi_{0.33}Co_{0.33}Mn_{0.33}O_2$ (layered structure) | — | — | — | 1.00 | 1.00 | B |
| Example 12 | | $BaTiO_3$ | $BaMnO_3$ | $Ba_4Ti_{12}O_{27}$ | 3.48 | 3.06 | A |
| Comparative Example 6 | $LiC_oO_2$ (layered structure) | — | — | — | 1.00 | 1.00 | B |
| Example 14 | | $BaTiO_3$ | $BaMnO_3$ | $Ba_4Ti_{12}O_{27}$ | 3.06 | 2.50 | A |
| Comparative Example 7 | $LiMn_2O_4$ (spinel structure) | — | — | — | 1.00 | 1.00 | B |
| Example 15 | | $BaTiO_3$ | $BaMnO_3$ | $Ba_4Ti_{12}O_{27}$ | 2.99 | 2.42 | A |
| Comparative Example 8 | $LiNiO_2$ (layered structure) | — | — | — | 1.00 | 1.00 | B |
| Example 16 | | $BaTiO_3$ | $BaMnO_3$ | $Ba_4Ti_{12}O_{27}$ | 2.88 | 2.33 | A |
| Comparative Example 9 | $LiNi_{0.5}Mn_{1.5}O_4$ (spinel structure) | — | — | — | 1.00 | 1.00 | B |
| Example 17 | | $BaTiO_3$ | $BaMnO_3$ | $Ba_4Ti_{12}O_{27}$ | 3.02 | 2.33 | A |
| Comparative Example 10 | $LiNi_{0.8}Co_{0.15}Al_{0.05}O_2$ (layered structure) | — | — | — | 1.00 | 1.00 | B |
| Example 18 | | $BaTiO_3$ | $BaMnO_3$ | $Ba_4Ti_{12}O_{27}$ | 3.08 | 2.55 | A |

As shown in Table 5, when any of the positive electrode active materials was used, the effect of the technology disclosed herein was suitably exhibited by using the dielectric and the compounds B and C together. Accordingly, it was found that the technology disclosed herein can be applied to positive electrode active materials of various types and crystal structures. In addition, although a mechanism is unknown, when a lithium nickel cobalt manganese composite oxide was used as the positive electrode active material, the increase in the discharging capacity during high rate discharging and the capacity retention rate after the high rate cycle test were the highest. Accordingly, it was found that, when a lithium nickel cobalt manganese composite oxide was used as the positive electrode active material, the effect of the technology disclosed herein was exhibited at a higher level.

Test Example VI. Study on Type of Compounds B and C

In Test Example VI, lithium secondary batteries were constructed in the same manner as in Comparative Example 1 and Examples 2 and 3 of Test Example I except that positive electrode materials of the following Examples 19 to 23 and Comparative Examples 11 to 14 were used, and various evaluations were performed. The results are shown in Table 6.

Examples 19 to 23 and Comparative Examples 11 to 14

In Examples 19 to 21 and Comparative Examples 11 and 12, composite particles were prepared in the same manner as in Example 2 except that materials (and a diffraction angle 2θ) shown in Table 6 were used as the compound B, and used as the positive electrode material. In Examples 22 and 23 and Comparative Examples 13 and 14, composite particles were prepared in the same manner as in Example 3 except that materials shown in Table 6 were used as the compound C, and used as the positive electrode material.

TABLE 6

| | Positive electrode material | | | 20 C discharging capacity | Capacity retention rate | Internal short-circuit resistance |
|---|---|---|---|---|---|---|
| | Dielectric | Compound B (2θ) | Compound C (2θ) | | | |
| Comparative Example 1 | — | — | — | 1.00 | 1.00 | B |
| Example 2 | $BaTiO_3$ | $BaMnO_3$ (2θ = 25°) | — | 2.01 | 1.52 | A |
| Example 19 | | $BaCoO_3$ (2θ = 24°) | — | 1.99 | 1.50 | A |
| Example 20 | | $BaNiO_3$ (2θ = 26°) | — | 2.06 | 1.52 | A |
| Example 21 | | $BaFeO_3$ (2θ = 24°) | — | 2.01 | 1.51 | A |
| Comparative Example 11 | | $Ba(NO_3)_2$ (2θ = 18°) | — | 1.04 | 1.03 | B |
| Comparative Example 12 | | $Ba_2TiSi_2O_4$ (2θ = 32°) | — | 1.05 | 1.01 | B |
| Example 3 | | — | $Ba_4Ti_{12}O_{27}$ (2θ = 26°) | 2.02 | 1.53 | A |
| Example 22 | | — | $Ca_4Ti_{12}O_{27}$ (2θ = 28°) | 2.07 | 1.55 | A |
| Example 23 | | — | $La_4Ti_{12}O_{27}$ (2θ = 27°) | 2.04 | 1.56 | A |

TABLE 6-continued

| | Positive electrode material | | | 20 C discharging capacity | Capacity retention rate | Internal short-circuit resistance |
|---|---|---|---|---|---|---|
| | Dielectric | Compound B (2θ) | Compound C (2θ) | | | |
| Comparative Example 13 | | — | $Na_{0.2}Fe_{0.2}Ti_{18}O_4$ (2θ = 19°) | 1.02 | 1.08 | B |
| Comparative Example 14 | | — | $Gd_2Ti_2O_7$ (2θ = 31°) | 1.06 | 1.03 | B |

As shown in Table 6, in Comparative Examples 11 and 12 in which a Ba-containing compound with a diffraction angle 2θ of 18° or 32° was used as the compound B, a battery temperature during the nail penetration test increased to 200° C. or higher. In addition, in Comparative Examples 11 and 12, a discharging capacity during high rate discharging and a capacity retention rate after the high rate cycle test were the same as those of Comparative Example 1 in which the positive electrode active material was used without change. On the other hand, in Examples 19 to 21 in which a Ba-containing compound with a diffraction angle 2θ of 24° to 26° was used as the compound B, excellent output characteristics and internal short-circuit resistance were realized as in Example 2. Accordingly, it was found that, when a Ba-containing compound with a diffraction angle 2θ of 24° to 26° was used as the compound B, the effect of the technology disclosed herein was suitably exhibited.

In addition, in Comparative Examples 13 and 14 in which a Ti-containing compound with a diffraction angle 2θ of 19° or 31° was used as the compound C, a battery temperature during the nail penetration test increased to 200° C. or higher. In addition, in Comparative Examples 13 and 14, a discharging capacity during high rate discharging and a capacity retention rate during the high rate cycle test were the same as those of Comparative Example 1 in which the positive electrode active material was used without change. On the other hand, in Examples 22 and 23 in which a Ti-containing compound with a diffraction angle 2θ of 26° to 28° was used as the compound C, excellent output characteristics and internal short-circuit resistance were realized as in Example 3. Accordingly, it was found that, when a Ti-containing compound with a diffraction angle 2θ of 26° to 28° was used as the compound C, the effect of the technology disclosed herein was suitably exhibited.

As described above, when a positive electrode material including a positive electrode active material, a barium titanate-based dielectric, and at least one of the compounds B and C disposed in contact with the dielectric was used, it was possible to appropriately realize a lithium secondary battery having excellent output characteristics and internal short-circuit resistance. Such results indicate the significance of the technology disclosed herein.

While the present disclosure has been described above in detail, the embodiments and examples are only examples, and the disclosure disclosed here includes various alternations and modifications of the specific examples described above.

What is claimed is:

1. A positive electrode material for a lithium secondary battery comprising:
    a positive electrode active material;
    a barium titanate-based dielectric; and
    at least one of a following Compounds I and II:
    Compound I: a compound which contains an element Ba and has a largest peak at a position with 2θ=24° to 26° in an X-ray diffraction pattern obtained according to X-ray diffraction measurement using CuKα rays; and
    Compound II: a compound which contains an element Ti and has a largest peak at a position with 2θ=26° to 28° in the X-ray diffraction pattern obtained according to X-ray diffraction measurement using CuKα rays,
    wherein at least one of Compounds I and II is disposed in contact with the dielectric.

2. The positive electrode material according to claim 1, wherein a content proportion of the dielectric is 0.1 mol % or more and 10 mol % or less with respect to 100 mol % of the positive electrode active material.

3. The positive electrode material according to claim 1, wherein a content proportion of at least one of Compounds I and II is 0.001 mol % or more and 5 mol % or less with respect to 100 mol % of the positive electrode active material.

4. The positive electrode material according to claim 1, wherein at least one of Compounds I and II is fused to the dielectric.

5. A lithium secondary battery comprising:
    a positive electrode including the positive electrode material according to claim 1.

* * * * *